United States Patent
Ostner et al.

(10) Patent No.: US 9,849,626 B2
(45) Date of Patent: Dec. 26, 2017

(54) METHOD FOR PRODUCING AN INTERIOR TRIM PART OF A VEHICLE

(71) Applicant: Lisa Dräxlmaier GmbH, Vilsbiburg (DE)

(72) Inventors: Daniel Ostner, Geisenhausen (DE); Astrid Jünger, Stephanskirchen (DE); Andrea Fagner, Bodenkirchen (DE)

(73) Assignee: Lisa Draexlmaier GmbH, Vilsbiburg (DE)

(*) Notice: Subject to any disclaimer, the term of this patent is extended or adjusted under 35 U.S.C. 154(b) by 704 days.

(21) Appl. No.: 14/347,964

(22) PCT Filed: Sep. 21, 2012

(86) PCT No.: PCT/EP2012/068619
§ 371 (c)(1),
(2) Date: Mar. 27, 2014

(87) PCT Pub. No.: WO2013/045356
PCT Pub. Date: Apr. 4, 2013

(65) Prior Publication Data
US 2014/0238587 A1    Aug. 28, 2014

(30) Foreign Application Priority Data
Sep. 29, 2011  (DE) .................. 10 2011 083 711

(51) Int. Cl.
*B29C 63/04*    (2006.01)
*B32B 38/18*    (2006.01)

(52) U.S. Cl.
CPC .............. *B29C 63/04* (2013.01); *B32B 38/18* (2013.01); *B32B 38/1866* (2013.01);
(Continued)

(58) Field of Classification Search
CPC .............. Y10T 156/1051; B29C 63/04; B32B 38/1866
(Continued)

(56) References Cited

U.S. PATENT DOCUMENTS 2,308,302 A   12/1938 Prudden
5,322,335 A    6/1994 Niemi
(Continued)

FOREIGN PATENT DOCUMENTS

DE    198 49 366 A1    4/2000
DE    102 44 709 A1    4/2004
(Continued)

OTHER PUBLICATIONS

"Gromco" (Jan. 5, 2004) http://discuss.gromco.com/snl/tz37685.html.*
"How to Decoupage Round Objects" (last updated Jun. 27, 2011) http://www.ehow.com/how_8653951_decoupage-round-objects.html.*
"Wrapping Spheres with Flat Paper", (Jul. 16, 2008).*
"Decoupage Easter Eggs" (2015) http://diyselfy.blogspot.com/2015/03/decoupage-easter-eggs.html.*
(Continued)

*Primary Examiner* — Philip Tucker
*Assistant Examiner* — John Blades
(74) *Attorney, Agent, or Firm* — Finnegan, Henderson, Farabow, Garrett & Dunner LLP

(57) ABSTRACT

A method of producing an interior trim part of a vehicle. The method includes forming a carrier having a carrier surface. The carrier surface is at least partially uneven. The method further includes applying a decorative paper layer on the carrier surface. The decorative paper layer is selectively folded at predetermined locations during or before being applied onto the carrier surface.

12 Claims, 3 Drawing Sheets

(52) U.S. Cl.
CPC ....... *B32B 2309/02* (2013.01); *B32B 2317/12* (2013.01); *B32B 2605/003* (2013.01); *Y10T 156/1039* (2015.01); *Y10T 156/1049* (2015.01); *Y10T 156/1051* (2015.01)

(58) Field of Classification Search
USPC ........................................................ 156/227
See application file for complete search history.

(56) References Cited

U.S. PATENT DOCUMENTS

2006/0226626 A1* 10/2006 Dehn .................... B29C 70/342
    280/220
2010/0276056 A1* 11/2010 Traboulsi ................. B32B 7/12
    156/60

FOREIGN PATENT DOCUMENTS

| DE | 10 2008 033 283 B3 | 1/2010 |
|---|---|---|
| EP | 2 143 589 A1 | 1/2010 |
| WO | WO 98/26918 A1 | 6/1998 |

OTHER PUBLICATIONS

International Search Report, issued by European Patent Office as International Searching Authority, dated Dec. 21, 2012, in International Application No. PCT/EP2012/068619 (6 pages including English translation).

* cited by examiner

… … …

METHOD FOR PRODUCING AN INTERIOR TRIM PART OF A VEHICLE

CROSS-REFERENCE TO RELATED APPLICATIONS

This is a U.S. National Phase of PCT/EP2012/068619, filed Sep. 21, 2012, which claims the benefit of priority to German Patent Application No. 102011083711.6, filed Sep. 29, 2011, the contents of both of which are incorporated herein by reference.

FIELD OF TECHNOLOGY

The present invention relates to a method of producing an interior trim part of a vehicle, in which a carrier provided with an uneven surface is formed at least in certain areas and provided with a decorative paper layer.

BACKGROUND

In the manufacture of an interior trim part of a vehicle, these parts often assume forms that exhibit uneven surfaces. Until now, such uneven surfaces are usually designed as plastic components in an injection molding process, or as a carrier made of natural-fiber mats compressed with one another, and visually enhanced in a second step, e.g., covered by a camouflage, such as leather, and the like.

A method of producing a decorative surface for interior automotive lining components is known from DE 10 2008 033 283 B3, wherein a one-piece skin is given a shape, such that a carrier with an uneven surface may be embellished as decorative.

This prior-art document relates to decorative surfaces, in which a carrier is covered by an imitation-leather skin, a slush, a TPO film, a PVC film, a foam film, a spray skin or a casting skin, in order to obtain a decorative seam appearance. This document teaches how to place the decorative layer, e.g., in the form of loops into a closed fold and closing it with a functional seam. The object of this patent application is to reduce the waste in the production of sewn decorative covers, while maintaining the appearance of a decorative seam cover.

However, the application of the method in accordance with this publication has the effect that in the area of the fold, the decorative skin exhibits a rear protruding area due to the inherent rigidity of the decorative material. This area must be removed in a subsequent step or alternatively, the adjacent component layers must be arranged such that the rear protruding area of the fold may be incorporated by these layers, e.g., by being surrounded by foam or placed in a recess.

The use of paper as a decorative material in the manufacture of an interior trim part of a vehicle is well-known in principle, e.g., from German published patent application DE 102 44 709 A1. This document proposes to provide the paper layer with grid-like incisions in order to be malleable similar to an expanded metal. To avoid visibility of the carrier in the area of the resulting holes in the decorative layer, the arrangement of multiple, mutually offset decorative layers is proposed. A drawback of this solution is that in order to achieve a closed decorative surface, multiple decorative layers must be applied on the carrier during successive steps, whereby positioning of the individual layers relative to one another must be made in a precisely fitting way.

SUMMARY

The object of the invention is to provide a method for producing an interior trim part according to which, an interior trim part of a vehicle provided with a decorative paper layer may also be formed.

This object is achieved by a method according to a first aspect of the present disclosure. Further embodiments of the invention are provided in additional aspects of the present disclosure.

According to the invention, a method of producing an interior trim part of a vehicle comprises a step of forming a carrier that is at least partially provided with an uneven surface, and a step of applying a decorative paper layer on the uneven surface of the carrier, wherein the decorative layer is provided for selective folding during or before the application on the uneven surface of the carrier. In other words, according to the invention, a decorative layer to be applied on the uneven surface is formed and processed with regard to folding as part of the molding in order to selectively introduce folds into the decorative layer.

As the decorative layer is intended for selective folding during or before its application on the uneven carrier surface, a high degree at reproducibility of automotive interior parts with decorative paper layers is made possible. Since paper is only slightly ductile, certain shapes of a carrier for an interior trim part will mean that the paper inevitably gets wrinkled. Only carrier surfaces that may be imaged onto a two dimensional plane distortion-free can be covered in a wrinkle-free fashion by a decorative paper layer based on a paper sheet in the form of a two dimensional plane. In order to allow for paper-layer decoration of today's conventional shapes of interior trim parts, whose surface cannot generally be imaged distortion-free in a two-dimensional plane, the inventive approach of providing and/or processing the decorative paper layer is followed, whereby the folding on the decorative paper layer is controlled at predefined points and in a defined manner.

As the decorative layer is intended for selective folding or processed with regard to folding, it is understood that various processing methods of the decorative paper layer are involved. These may be carried out before or during the application of the decorative layer onto the uneven surface of the carrier.

The carrier may be, e.g., a (natural, glass or carbon) fiber-reinforced plastic carrier or a natural-fiber carrier of fibrous materials, such as flax, sisal, hemp, kenaf, jute, or a similar material with a thermosetting or thermoplastic matrix. The carrier preferably comprises fibers prepared from cellulose fibers.

A haptic layer of a haptic-forming material, e.g., a foam, a textile, a knitted fabric, a fleece or some otherwise suitable material may be disposed on the carrier. This layer serves to provide tactile component softness for the vehicle occupant. When referring to a carrier in the following, both a carrier alone, as well as a carrier having at least partially a haptic top layer should be understood.

In a preferred embodiment, the material of the haptic layer comprises cellulose fibers.

The term paper refers to any cellulosic decorative material, which, like paper, has the property of essentially being non-ductile.

A preferred embodiment provides that the carrier and decorative material be made of the same cellulose, i.e., cellulose from the same source of raw material.

Due to the selective folding according to the invention, it is possible to have unavoidable folds either become invisible as geometric shapes or minimize them through process guiding, or using the folds themselves as decorative elements. A closed decorative layer adjusted to the contour of the carrier may likewise be formed by selective folding.

How the decorative layer for selective folding and/or processing of the decorative layer is provided depends, among other things, on the shape of the uneven surface of the carrier, upon which the decorative layer will be placed. The shape of the resulting fold pattern will also have to be considered.

The decorative paper layer is preferably prepared from a fiber pulp and in the meantime, i.e., already during the preparation from the fiber pulp, given a special contour, thus affecting the selective folding associated with the application of the decorative layer. In particular, this contour may entail that the material thickness and/or folding points on the decorative layer differ and becomes noticeable on the folding of the decorative layer, when applying the carrier. In this way, folding can be determined, when applying the decorative layer on a carrier, e.g., when concealing, which method makes it possible to apply a decorative layer on the uneven surface of the carrier.

With another preferred method, the paper is pre-imprinted or pre-folded, such that the folding of the decorative layer is affected during the application of the decorative layer. This method, also known as preforming, may thus determine especially the folding-formation sections, in that the anticipated folds are introduced in advance, when applying the decorative layer onto the carrier. Thus, it is possible to exclude undesired variations in the fold pattern substantially.

Furthermore, at least one incision is preferably made in the decorative paper layer prior to application, such that at least one overlap is created during application of the decorative layer, thereby affecting the folding of the decorative layer. In this way, it is possible to prevent folds at certain places in that, e.g., overlapping is caused. However, overlaps may actually be a desired feature. These can already be defined by making an incision, before applying the decorative layer on the carrier.

The decorative paper layer is advantageously provided, at least partially, with an additional material prior to application, such that the folding of the decorative layer is affected. The additional material may be introduced, e.g., in the paper, thereby strengthening or weakening the paper, such that folding is affected. In this way, it is possible to selectively create strengthened and weakened areas of the paper material, which substantially affect the fold pattern, when applying the decorative layer on the carrier.

Moreover, prior to the application, the decorative paper layer should preferably be moistened with a liquid, particularly water or soap suds, such that the folding of the decorative layer is affected. Moistening or application of soap suds may alter the properties of the paper, e.g., its ductility and strength, and is therefore suitable for affecting or even defining the desired fold pattern, when applying the decorative layer on the uneven surface of the carrier, already during pre-processing of the decorative paper layer.

The application of the decorative paper layer advantageously comprises a concealing process, in which the decorative layer is concealed on the uneven surface, such that the folding of the decorative layer is created in a peripheral area of the uneven surface. Here, an adapted plunger may, for example, be used, which pushes the folds to the outside and leaves a center area of the uneven surface of the carrier substantially fold-free. This process may also be assisted, e.g., by so-called pre-blowing of the paper, in which the surface of the paper may be affected. As a result of this pre-blowing, extensive fold-free areas may be created, as here, the paper becomes stretched and smoothed, and thus conforms with the carrier during the concealing process. It is also possible that as a result of pre-blowing, excess materials are generated and cause selective folding of the decorative layer in the areas of excess materials.

In addition, during a concealing process, imprinting of the decorative paper layer may be performed, which decoratively supports the folding process.

Furthermore, it is preferable that the paper of the decorative layer overlap at incisions and/or bends, such that the folding of the decorative layer is affected when applying the decorative layer on the carrier in a concealing process. This preferred feature of the method may, especially preferably, be combined with the introduction of incisions or bends in the paper during pre-processing, which will control the overlapping.

Thus, a preferred feature of the folds developing in the decorative layer is that the decorative layer will be present in a multi-layered fashion in the area of the folds after application on the carrier layer. Here, in the case of overlapping, the decorative layer is present in at least two layers, depending on the selected type of folding, but also in three or four layers, or with an even greater amount of layers.

Another preferred feature of the folds developing in the decorative layer is that, in the area of folding, the individual layers of the decorative layer are situated immediately adjacent to one another, preferably adjoin one another, while forming a contact surface, and especially preferred, adjoining and interconnected.

It is furthermore preferable, that the decorative paper layer be sucked on or fixed during the concealing at at least one fixation point, such that a star-shaped folding of the decorative layer is created around the fixation point. In this context, star-shaped folding refers to any type of folding that may be recognized as concentrically or radially oriented toward the fixation point or pointing to the fixation point in some other identifiable way.

In a preferred embodiment, the decorative layer, at least in the areas in which it is present as multilayered after the concealing process, preferably in the area of the contact surfaces, can or will be provided with an bonding agent, preferably a heat-activatable bonding agent, such as, for example, a hot-melt bonding agent. Thus, a projection of the decorative layer in the fold area may, for example, be prevented after the concealing process, whereby the folding of the decorative layer may be fixed.

An alternative embodiment intends for the decorative layer in the area of the contact surfaces to be provided with a seam in order to connect the multiple layers of the decorative layer in the area of the folds and/or overlaps. At the same time, such seams offer a further design option, e.g., for increasing the perceived value of the decorative surface.

In a further advantageous embodiment of the invention, the areas of the decorative layer, where folding has occurred, are reduced in terms of their material thickness, after the concealing process, such that excess material may be removed at the folds and overlaps, and as a result, a substantially uniform thickness of the decorative layer is realized.

The material removal may be done, e.g., by a peeling, grinding, polishing or milling process. Other suitable removal methods are also conceivable. In a preferred embodiment, the decorative layer is moistened before or during the removal of material. In particular, if the paper used has a very homogeneous structure, ensuing visibility of the folds can be prevented by such a processing step.

However, the removal of material may also be used alternatively to obtain an additional decor in the area of the folds, e.g., in that the removal method is used to expose differently colored areas of the decorative layer.

After the application of the decorative paper layer, an overlay film and/or varnish layer is advantageously applied on the decorative layer, such that the folding of the decorative layer is additionally fixed. In this way, for instance, the scratch resistance or the insensitivity to dirt of the decorative paper layer may be increased and/or other decorative effects may be achieved.

The overlay film and/or varnish coat may be used in a subsequent step together with an imprint, e.g., an imitated natural grain, or provided with a created pattern. In this way, e.g., a leather layer may be imitated.

The paper of the decorative layer may be single- or multi-colored. It is thereby preferred that the coloration of the paper is done during production.

In a special embodiment, the coloration of the decorative layer may be performed, such that the colors of the side essentially intended to be visible differ from those of the side essentially intended to be the reverse of the decorative layer. By skillfully choosing a certain fold pattern, such a decorative layer may be used to obtain an advantageous design, in which the color of the reverse in the area of the folds is at least partially visible.

The decorative layer may be additionally imprinted, before or after application. Imprinting may be done by any prior-art method and, for example, in order to depict samples or imagery and visually locate functional elements disposed behind these areas.

The decorative layer may be provided at least partially with perforations in order to be light-permeable, or such that a liquid may flow through it.

The paper of the decorative layer is a cellulosic material that may be present in coated, varnished, impressed and/or printed form, and whose basis weight is preferably between 20 g/m$^2$ and 600 g/m$^2$. The paper may also consist in whole or partially of recycled materials, and be mixed with an alkaline lye, in order to reduce friction against the processing tool.

Besides cellulosic fibers, the material of the decorative layer may additionally display a blend of transparent glass and/or plastic fibers. Such a material is light-permeable, e.g., due to a light source disposed behind a decorative layer.

With light-permeable materials, folding may equally be used here to produce optical effects, as the degree of transparency in the area of overlaps and folds varies from the surrounding areas. This may give rise to the creation of patterns that will only be visible, when backlighting the decorative layer.

As long as the carrier is provided with a thermosetting matrix, the carrier may be cured without additional adhesives and connected with the decorative layer in a tool at temperatures between 100° C. and 250° C., preferably between 180° C. and 220° C. With a thermoplastic matrix, the carrier is preferably pre-heated in a contact-heating press, compressed and joined with the decorative layer in a cold press, whereby an adhesive for bonding the decor and carrier is preferably used.

In an alternative embodiment, during preparation, the decorative layer may already be provided with an activatable adhesive, e.g., a hot-melt adhesive, which may be used for subsequent bonding of the decorative layer with the carrier layer and/or an overlay film, or for bonding the individual layers of the decorative layer in the area of the folds. The adhesive may be provided here on either or both sides of the decorative layer, evenly distributed, or incorporated therein, during preparation of the decorative layer.

With the above-described method it is possible to produce an interior trim part of a vehicle, which, compared with the prior art, are characterized by excellent optics. Selective guiding of the folds in the new decorative paper layer material makes it possible to use new materials and implement the interior trim part more easily without compromising the optical appearance. Moreover, the method is characterized in that it is possible to make interior parts, whose material can be substantially and highly efficiently recycled, i.e., with low production costs and based on a low commodity price.

Examples of the inventive interior trim parts include lining components of the vehicle interior, e.g., a headliner, a door lining, an instrument panel, a center console, a back shelf, and the like.

DESCRIPTION OF THE EMBODIMENTS

Figure 1A:
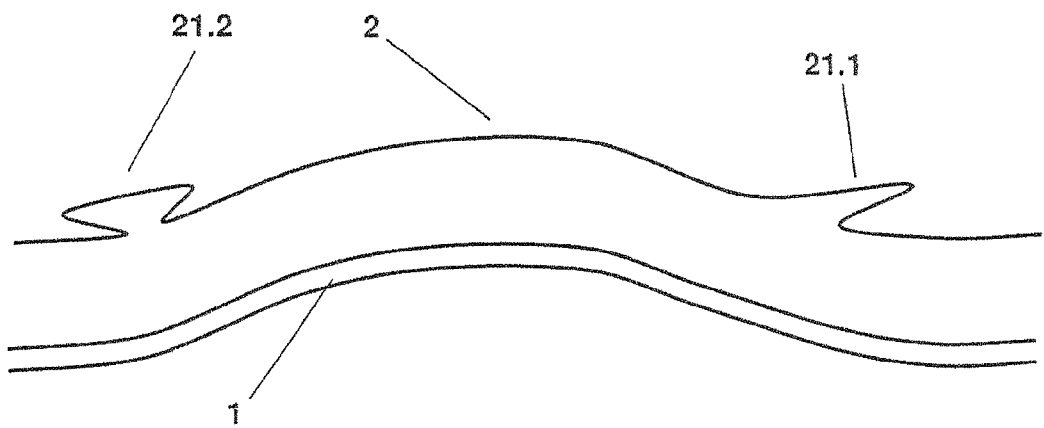
FIGS. 1A-1C represent schematic sectional views of a decorative layer with a fold formation.
Figure 1B:
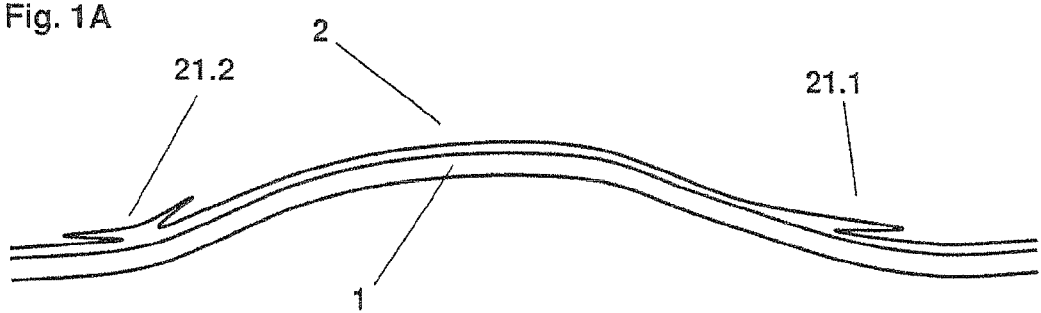
Figure 1C:
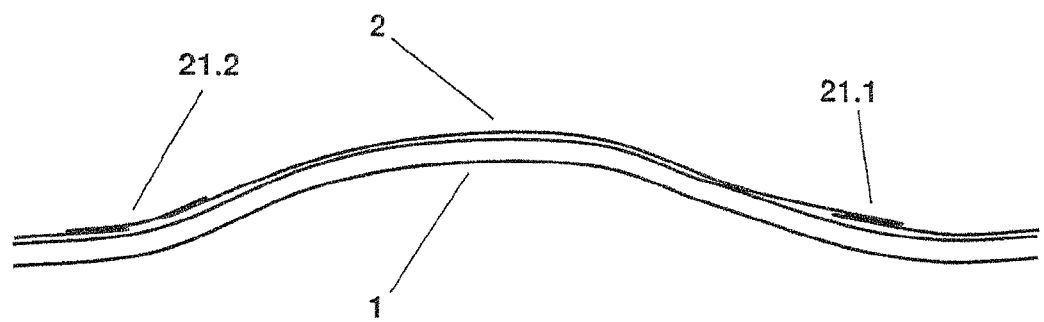

FIGS. 1A-1C are schematic sectional views of a decorative layer 2 with differently pre-formed folding areas 21.1, 21.2 at the various stages of application onto the carrier 1.

FIG. 1A is a sectional view of the decorative layer 2, still arranged at a distance from the already formed carrier 1, in which however, two folds are already made, and forming one or more alternate angles in the cross-section, i.e., a so-called Z-fold 21.1 and a double Z-fold 21.2. Advantageously, the folds 21.1, 21.2 begin at the edge and extend, while adapted to the geometry of carrier 1, at preset angles into the interior of the decorative layer 2. The alternate angles and/or Z-folds, visible in the cross-section when extending from the edge of decorative layer 2 into the interior of decorative layer 2, may exhibit diminishing side lengths and thus cause the fold to taper off. Alternatively, an incision may be provided in the interior of the decorative layer allowing for compression of the fold without causing undesirable material accumulation. The folding or crease lines extend along the vertices of the Z-folds 21.1, 21.2. FIG. 1B shows a first subsequent stage of the application of the decorative layer 2 onto the carrier 1. A loose compression of the decorative layer 2 has by then occurred, and defined fold lines have formed. FIG. 1C shows a further subsequent stage of applying the decorative layer 2 onto the carrier 1, in which activation of the hot-melt bonding agent contained in the decorative layer has caused bonding of carrier 1 with the decorative layer 2 and internal bonding of the decorative layer 2 present as a multilayer in the area of folds 21.1 and 21.2.

Figure 2A:
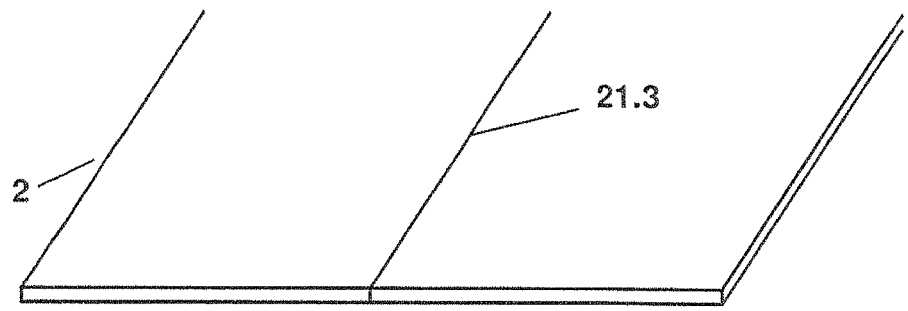
FIGS. 2A-2C represent schematic views of a decorative layer with an incision.
Figure 2B:
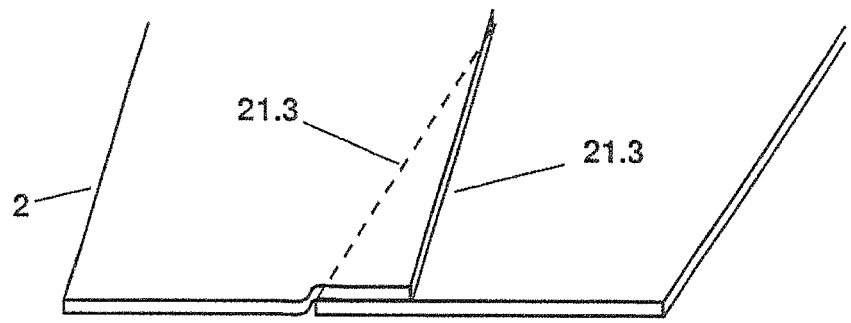
Figure 2C:
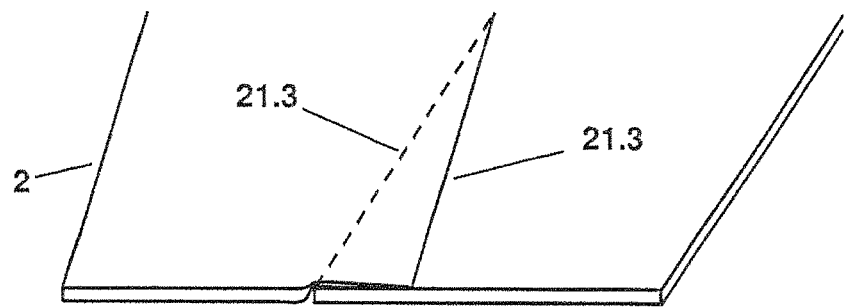

FIGS. 2A-2C is a schematic view of a decorative layer 2, having an incision with cutting edges 21.3 in order to create a defined overlap area between the cutting edges of the incision 21.3, as the decorative layer 2 is applied onto the carrier (not shown).

Here, FIG. 2A shows an even decorative layer 2 provided with an incision 21.3 at the edge, whereby two cutting edges are formed. FIG. 2B shows a subsequent step, in which the decorative layer 2 is arranged in an overlapping fashion in the area formed by the cutting edges of incision 21.3, whereby the decorative layer forms an uneven contour (not shown) adapted to the carrier. Moreover, the mutually overlapping areas of the decorative layer are interconnected, e.g., by a bonding agent. FIG. 2C shows a further subsequent step, where in the area of overlap, the upper decorative layer 2 has thinned as a result of material removal, such that the thickness of the decorative layer 2 in the overlap area differs only slightly from the surrounding areas.

Figure 3A:
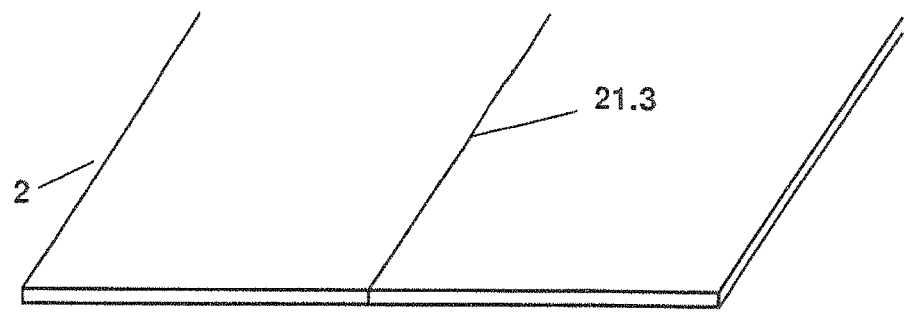
FIGS. 3A-3C represent schematic views of a decorative layer with an incision, and a preformed folding area.
Figure 3B:
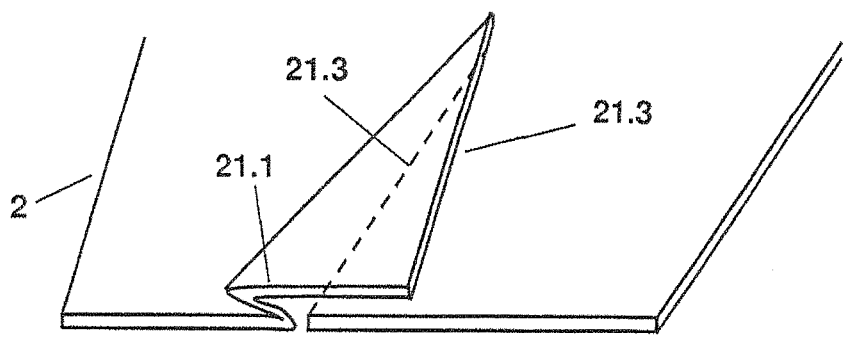
Figure 3C:
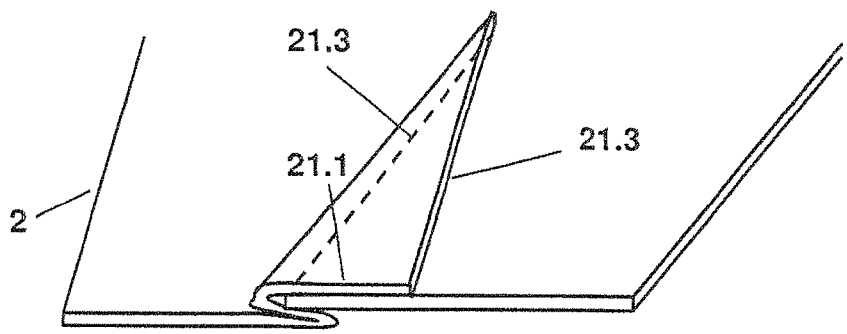

FIGS. 3A-3C are likewise a schematic view of a decorative layer 2 having an incision with cutting edges 21.3 and a preformed folding area 21.1 for receiving a cutting edge of the incision 21.3 of the decorative layer, when applying the decorative layer 2 onto the carrier (not shown).

Here, FIGS. 3A and 2A, respectively, show a decorative layer 2 provided with an incision 21.3 at the edge.

FIG. 3B in a subsequent step shows the decorative layer 2, whereby one of the cutting edges of the incision 21.3 is preformed to a Z-fold 21.1, whereby the side lengths of the Z-fold 21.1 are formed, such that it tapers in the direction from the edge of the decorative layer 2 into its interior. Two sides of the Z-fold 21.1 are formed to receive the opposite edge of the incision 21.3, whereby the originally even contour of the decorative layer 2 is changed to an uneven contour adapted to the contour of the carrier (not shown), due to the arrangement of the cutting edge within the side of the Z-fold 21.1. Due to the arrangement of the cutting edge within the side, it is also possible to create a certain tolerance compensation, in that the cutting edge is inserted more or less deeply into the side. FIG. 3C shows a later subsequent step, in which the overlapping areas of the decorative layer 2 are interconnected.

The invention claimed is:

1. A method of producing an interior trim part of a vehicle, comprising:
   forming a carrier having a carrier surface, at least a portion of the carrier surface being uneven;
   applying a decorative paper layer on the carrier surface, the decorative paper layer being selectively folded at predetermined locations during or before being applied onto the carrier surface, the decorative paper layer comprising a first surface which is a decorative surface and a second surface opposite the first surface;
   making at least one incision in the decorative paper layer before applying the decorative paper layer on the carrier surface, the at least one incision forming cutting edges of the decorative paper layer; and
   folding a first edge of the cutting edges,
   wherein applying the decorative paper layer includes a concealing process for concealing a least a portion of the first surface of the decorative paper layer on the carrier surface,
   wherein two opposing sides on the second surface of the folded first edge of the decorative paper layer receive a second edge of the cutting edges.

2. The method according to claim 1, further comprising:
   forming the decorative paper layer using a fiber pulp, during which different material thicknesses or folding points are formed over the decorative paper layer.

3. The method according to claim 1, further comprising:
   at least one of imprinting or prefolding the decorative paper layer before applying the decorative paper layer on the carrier surface.

4. The method according to claim 1,
   wherein applying the decorative paper layer on the carrier surface comprises creating at least one overlap using the cutting edges of the at least one incision.

5. The method according to claim 1, further comprising:
   providing an additional material at least partially to the decorative paper layer before applying the decorative paper layer on the carrier surface.

6. The method according to claim 5, wherein providing the additional material includes providing a liquid.

7. The method according to claim 6, wherein providing the liquid includes providing at least one of water or soap suds.

8. The method according to claim 1, wherein the concealing process includes laminating the decorative paper layer on the carrier surface, such that folding of the decorative paper layer is caused in a peripheral area of the uneven portion of the carrier surface.

9. The method according to claim 1, wherein:
   the decorative paper layer overlaps at one of incisions or bends.

10. The method according to claim 1, wherein:
    removing material such that a material thickness of the decorative paper layer is reduced in areas, in which folding has occurred.

11. The method according to claim 1, further comprising:
    applying at least one of an overlay film or a varnish coat on the decorative paper layer after applying the decorative paper layer on the carrier surface, to fix folding of the decorative paper layer.

12. A method of producing an interior trim part of a vehicle, comprising:
    forming a carrier for the interior trim part, the carrier having a carrier surface wherein at least a portion of the carrier surface is uneven;
    applying a decorative paper layer on the carrier surface, the decorative paper layer being selectively folded at predetermined locations during or before being applied onto the carrier surface;
    making at least one incision in the decorative paper layer before applying the decorative paper layer on the carrier surface, the at least one incision forming two cutting edges of the decorative paper layer; and
    folding a first edge of the cutting edges,
    wherein applying the decorative paper layer further comprises:
       concealing the decorative paper layer on the carrier surface such that the selective folding is caused in a peripheral area of the uneven portion of the carrier surface; and
       receiving a second edge of the cutting edges between two opposing sides of the folded first edge of the decorative paper layer.

* * * * *